(12) United States Patent
Zerber

(10) Patent No.: US 6,175,877 B1
(45) Date of Patent: *Jan. 16, 2001

(54) INTER-APPLET COMMUNICATION WITHIN A WEB BROWSER

(75) Inventor: Kevin Gregory Zerber, Redwood City, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/985,428

(22) Filed: Dec. 4, 1997

(51) Int. Cl.[7] .............................. G06F 9/54; G06F 15/167
(52) U.S. Cl. .......................... 709/310; 709/217; 709/203
(58) Field of Search ..................................... 709/300, 310, 709/312, 313, 329, 203, 201, 217, 219; 707/501

(56) References Cited

U.S. PATENT DOCUMENTS

| | | | |
|---|---|---|---|
| 5,446,896 | * 8/1995 | Hegarty et al. | 395/650 |
| 5,742,768 | * 4/1998 | Gennaro et al. | 295/200.33 |
| 5,838,906 | * 11/1998 | Doyle et al. | 395/200.32 |

OTHER PUBLICATIONS

Edith Au, Dave Makower, and the Pencom Web Works. "Java Programming Basics" Chapter 3 –Viewing and Using Java Applets, Mar. 1996.*

Dr. Dobb's Journal. "Java and Inter–Applet Communication", Oct. 1997.*

(MECKLER) Meckler, Andrew. "Java and Inter–Applet Communication" Dr. Dobb's Journal, Oct. 1997.*

* cited by examiner

Primary Examiner—Alvin E. Oberley
Assistant Examiner—Lewis A. Bullock, Jr.
(74) Attorney, Agent, or Firm—Kudirka & Jobse, LLP

(57) ABSTRACT

The present invention discloses a system for providing communication between applets. A browser, such as an HTML web browser, is executed within a computer and a server program including a protocol, such as the HTTP protocol, is executed in the browser. A first page is executed within the browser and a first applet, such as a Java applet, is executed within the first page. A second page is executed within the browser and a second applet is executed within the second page. The second applet transmits data to the server program using the protocol. The first applet executing in the first page processes the data transmitted from the second applet to the server program. The first applet may be used to establish a connection with a remote server over a network using a second protocol, such as POP3, IMAP4, LDAP, SMTP, and transmit the data received from the second applet to the remote server via the network using the second protocol.

24 Claims, 4 Drawing Sheets

INTER-APPLET COMMUNICATION WITHIN A WEB BROWSER

CROSS-REFERENCE TO RELATED APPLICATIONS

This application is related to the following co-pending and commonly-assigned application:

Application Ser. No. 08/984,750, filed on the same date herewith, by Kevin G. Zerber, entitled "Accessing a Post Office System From a Client Computer Using Applets," attorney's docket number L09-97-034, which is incorporated herein by reference in its entirety.

BACKGROUND OF THE INVENTION

1. Field of the Invention

The present invention relates generally to a system for inter-applet communication within a web browser.

2. Description of the Related Art

Applets are small application programs. Applets often perform various operations in Hypertext Markup Language (HTML) web browsers, such as IBM's Web Explorer, Netscape's Navigator, Sun Microsystem's HotJava Browser, Microsoft's Internet Explorer, etc. Many of these browsers are Java™ enabled, which means they can execute applets written in the Java programming language. Typically, Java applets are included with data a user downloads from the Internet using the web browser. An applet executing in the web browser can cause the web browser to perform various operations such as fetching and playing an audio clip, displaying a short message in the status line, displaying moving animation or displaying a different web page. Applets can also run in applet viewers.

However, the prior art does not provide an integrated and uncomplicated approach for inter-applet communication within a web browser.

SUMMARY OF THE INVENTION

To overcome the limitations in the prior art, the present invention discloses a system providing communication between applets. A browser is executed within a computer and a server program including a protocol is executed in the browser. A first page is executed within the browser and a first applet is executed within the first page. A second page is executed within the browser and a second applet is executed within the second page. The second applet transmits data to the server program using the protocol. The first applet executing in the first page processes the data transmitted from the second applet to the server program.

In preferred embodiments, the browser is a Hypertext Markup Language (HTML) web browser and the protocol is the Hypertext Transfer Protocol (HTTP).

In further embodiments, the first applet executing in the first page further performs the steps of establishing a connection with a remote server over a network using a second protocol and transmitting the data received from the second applet to the remote server via the network using the second protocol.

It is an object of the present invention to provide a system for communication between applets within a web browser.

It is a further object of the invention to utilize the protocol included in the web browser, such as the HTTP protocol, as the basis for communication between applets in the web browser.

It is yet a further object of the present invention to designate one applet as an interface between the other applets in the web browser and a remote server to provide data communication between the applets and the remote server.

These and various other features as well as advantages which characterize the present invention will be apparent upon reading of the following detailed description and review of the associated drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Description

Figure 1:
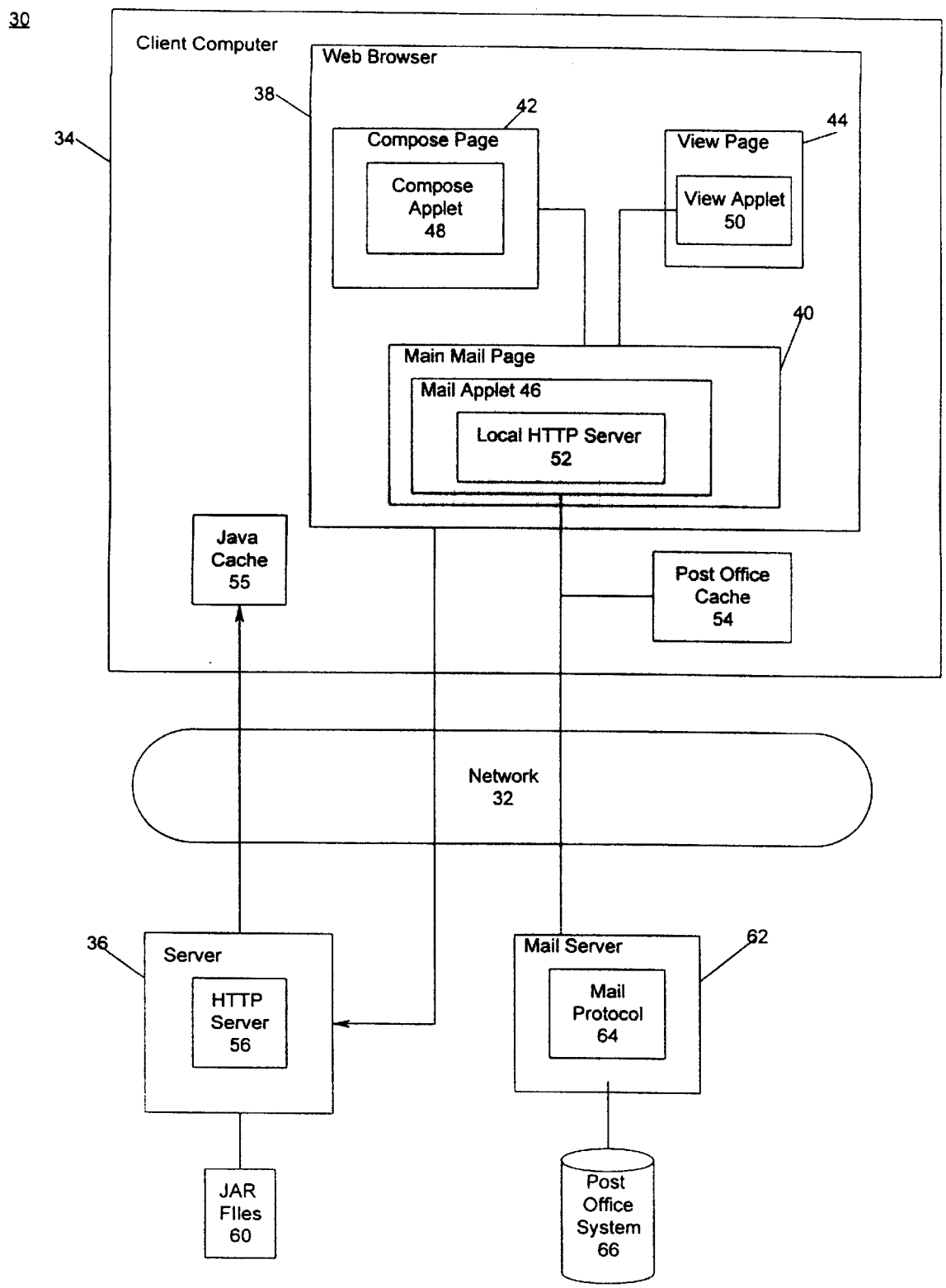
FIG. 1 is a block diagram that illustrates the relationship between a client computer, a post office system, and an HTTP server in accordance with the present invention.

FIG. 1 schematically illustrates the environment of the preferred embodiment of the present invention, and more particularly, illustrates a typical distributed computer system 30 using the Internet or other network 32 to connect a client computer 34 to a server 36 and a mail server 62. A typical combination of resources may include clients computers 34 that are personal computers, laptops, palmtops or workstations, and servers 36, 62 that are personal computers, workstations, minicomputers or mainframes. The network 12 may comprise networks such as LANs, WANs, SNA networks, and the Internet.

FIG. 1 illustrates further details of the client computer 34, the server 36, the mail server 62, and the interaction therebetween. In preferred embodiments, the client computer 34 includes a Hyper Text Mark-up Language (HTML) web browser 38 (e.g., IBM's Web Explorer, Netscape's Navigator, Sun Microsystem's HotJava Browser, Microsoft's Internet Explorer, etc.). In preferred embodiments, the client computer 34 further includes a Java™ platform which enables the client computer to execute programs written in the Java™ computer language. The Java™ Platform may be installed in the client computer 34 or may be embedded in the web browser 38 software. A computer that implements the Java platform is referred to as a Java virtual machine. The Java virtual machine hides the underlying operating system of the client computer 34 (e.g., Windows, Unix, AIX, Solaris, etc.) from Java based applets and applications. An applet is a generally small application program. The Java platform translates the Java based applets and applications to bytecodes which are understood by the underlying operating system of the client computer 34.

The web browser 38 can generate a main mail page 40, a compose page 42, and a view page 44. In preferred embodiments, the pages 40, 42, and 44 are HTML pages and each page 40, 42, 44 includes a Java™ applet. A mail applet 46, a compose message applet 48, and a view applet 50 run in pages 40, 42, 44, respectively, to display information in their respective pages 40, 42, 44. The mail applet 46 causes the web browser 38 to display portions of the main mail page 40, which provides access to various mail box features, such as an inbox of messages, a message log of sent messages, drafts of messages not sent, a message composition template, etc. The mail applet 46 further creates a thread to run a local Hyper Text Transport Protocol (HTTP) server 52. The compose applet 48, which runs in the compose page 42, causes the web browser 38 to display portions of the compose page 42, which provides a template to compose new messages, and reply to and forward received messages. The view applet 50, which runs in the view page 44, causes the web browser 38 to display portions of the view page 44 in which the user may read and view the content of messages.

In preferred embodiments, the mail applet 46 is executed first to display the main mail page 40 including various mail box features. When the user selects to view or read a message, the mail applet 46 opens the view page 44, which includes the view applet 50. Similarly, when the user selects to compose, reply to or forward a message, the mail applet 46 opens the compose page 42, which includes the compose applet 48. In this way, in preferred embodiments, the applets and web pages are only loaded when needed.

The client computer 34 further includes a post office cache 54 and a Java cache 55. The post office cache 54 stores messages downloaded from the post office system 66 to the client computer 34. The Java cache 55 stores the Java files, applets, and classes which are needed to implement the mail applet 46, compose applet 48, view applet 50, and all the functions thereof.

The server 36 includes an HTTP server 56 and Java Archive (JAR) Files 60 which store Java applets in a compressed format. The JAR files 60 are stored in a directory in the server 36 which is relative to a directory including the HTTP server 56. The HTTP server 56 receives a request from the client computer to access the post office system 66. The HTTP server 56 processes this request and transmits a web page to the client computer 34 with an embedded URL link to a JAR file in the JAR files 60 directory. When the web browser 38 of the client computer 34 opens the web page including the embedded link to a JAR file in the server 36, the web browser 38 then transmits to the HTTP server 56 a request for the JAR file. The HTTP server 56 processes this request and retrieves the requested JAR file to download to the client computer 34 via the network 32 for storage in the Java cache 55. In preferred embodiments, the applets 46, 48, 50 are stored within a single JAR file downloaded to the client computer 34.

The present invention further includes a mail server 62 which may be a mainframe, minicomputer, workstation or personal computer. The mail server 62 runs a mail protocol 64 (e.g., POP3, IMAP4, SMTP, LDAP, etc.) and a post office system 66 (e.g., Lotus cc:Mail, Lotus Notes, Lotus Domino, Novell's Groupwise, etc.). In preferred embodiments, the protocol which allows the client computer 34 to communicate with the post office system 66 is maintained in the mail applet 46. Thus, the mail applet 46 runs a protocol compatible with the mail protocol 64 in the mail server 62, e.g., POP3, IMAP4, etc. In this preferred embodiment, the mail applet 46 provides the only socket link to the post office system 66 for the client computer 34.

Thus, the present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality.

Those skilled in the art will recognize that the exemplary environment illustrated in FIG. 1 is not intended to limit the present invention. Indeed, those skilled in the art will recognize that other alternative hardware environments may be used without departing from the scope of the present invention. For instance, in alternative embodiments, the HTTP server 56, JAR files 60, mail protocol 64, post office system 66 or any combination thereof may be installed on a single computer server or over several servers distributed over a network.

Accessing the Post Office System

Figure 2A:
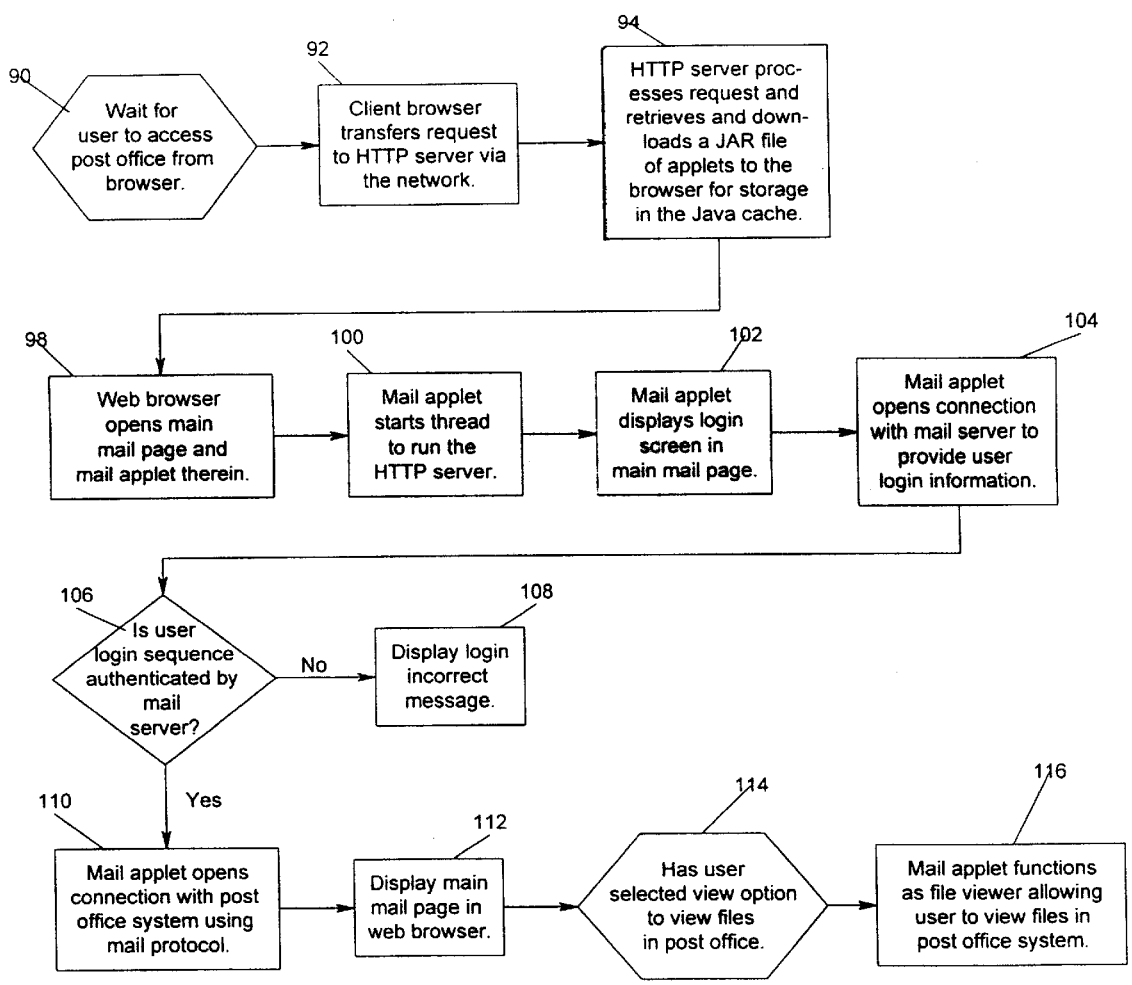
FIG. 2a is a flowchart that illustrates logic of how a client computer accesses a post office system in accordance with the present invention.
Figure 2B:
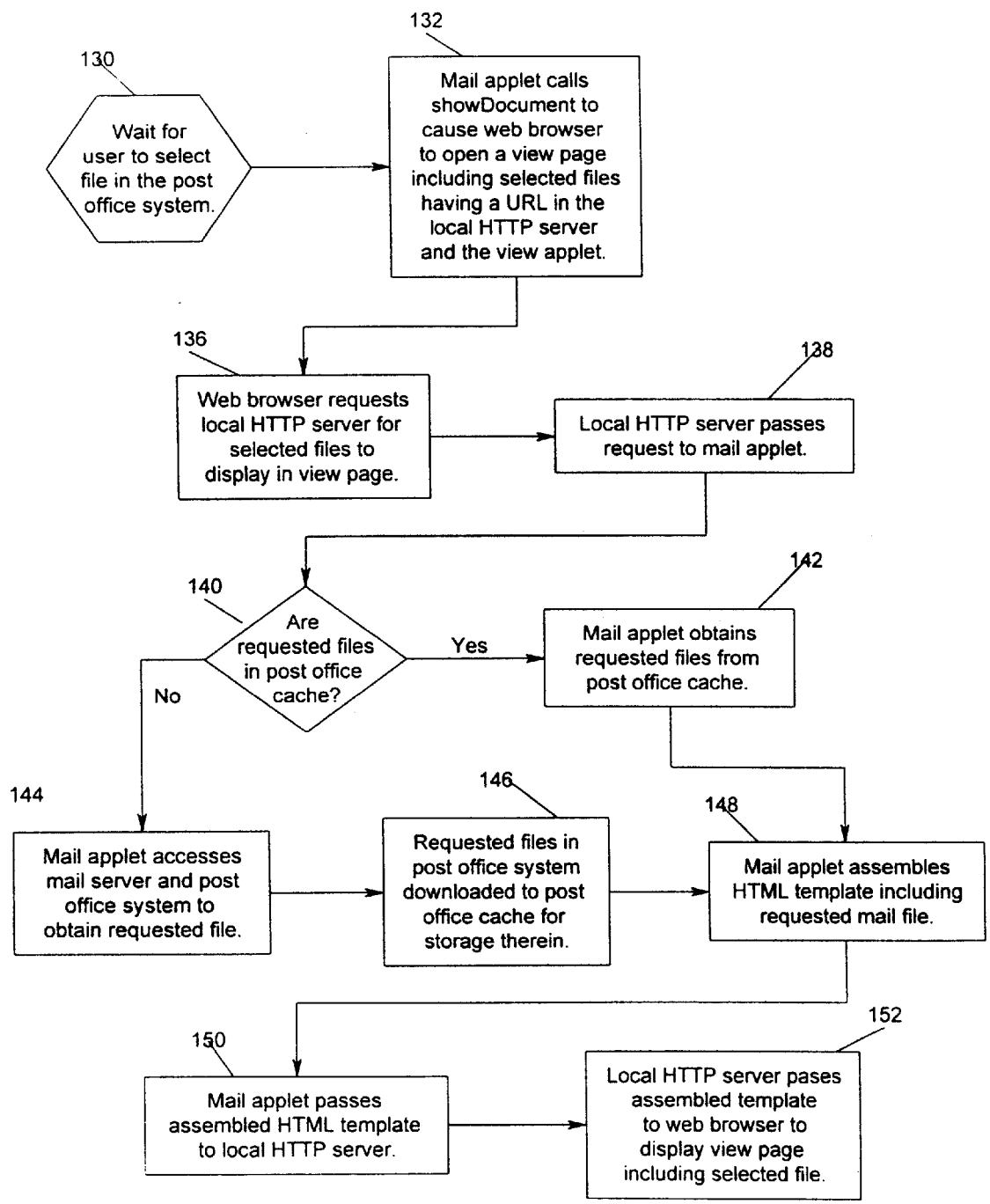
FIG. 2b is a flowchart that illustrates logic of how a user at a client computer selects a file in a post office system to view and download in accordance with the present invention.
Figure 2C:
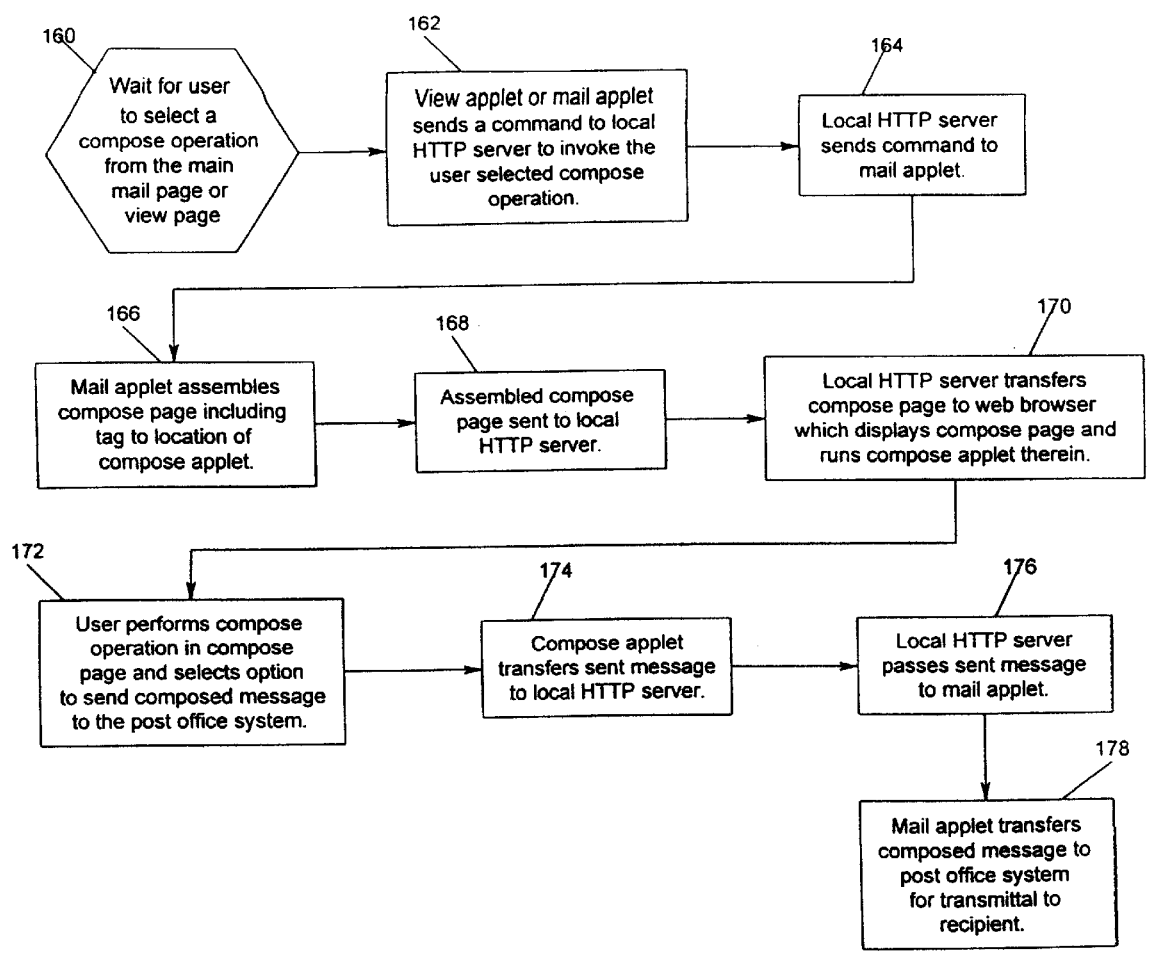
FIG. 2c is a flowchart that illustrates logic of how a user at a client computer composes messages for transmittal to a post office system in accordance with the present invention.

Flowcharts which illustrate preferred embodiments of the logic for accessing a post office system in accordance with the present invention are shown in FIGS. 2a, 2b, and 2c. Those skilled in the art will recognize that this logic is provided for illustrative purposes only and that different logic may be used to accomplish the same results.

FIG. 2a is a flowchart showing logic for how the client computer 34 initially accesses the post office system 66 in accordance with the present invention. At block 90, the system waits for a user to attempt to access the post office system 66 using the web browser 38. Control transfers to block 92 which represents the web browser 38 transferring a request to the HTTP server 56 via the network 32 to access the post office system 66. Control then transfers to block 94 which represents the HTTP server 56 processing the request and retrieving a JAR file including the three applets 46, 48, 50 and related programs and files. The HTTP server 56 transmits the retrieved JAR file to the client computer 34 for storage in the JAVA cache 55. As discussed, in preferred embodiments, the JAR file is downloaded by first downloading to the client computer 34 a web page with an embedded link to the JAR file. In preferred embodiments, the client computer 34 extracts the applets from the downloaded JAR file and stores the applets in the Java cache 55.

Upon downloading the JAR file and extracting the applets therein, control proceeds to block 98 which represents the web browser 38 opening the main mail page 40 and running the mail applet 46 stored in the Java cache 55 in page 40. Control transfers to block 100, which represents the mail applet 46 starting a new thread to run the local HTTP server 52. In preferred embodiments, the local HTTP server 52 would listen in on port 1110. In such case, the URL location for the local HTTP server 52 in the client computer 34 may be at http:\\localhost:1110. After invoking the main mail page 40 and the mail applet 46, control transfers to block 102 which represents the mail applet 46 displaying a login screen in the main mail page 40.

From block 102, control proceeds to block 104 which represents the mail applet 46 opening a connection with the mail server 62 to provide the user login information to the mail server 62. Control transfers to block 106, which represents the mail server 62, operating under control of the mail protocol 64, authenticating the user login information. If the user login information is not authenticated, control transfers to block 108; otherwise control transfers to block 110. Block 108 represents the mail applet 46, upon receiving indication of authentication failure from the mail server 62, displaying a login incorrect message in the main mail page 40. Block 110 represents the mail applet 46, upon receiving indication of authentication, opening a connection with the post office system 66 using the mail protocol 64. As discussed, the mail applet 46 includes a mail protocol compatible with the mail protocol 64 employed in the mail server 62. Control transfers to block 112 which represents the web browser 38 displaying in the main mail page 40 graphical representations of common e-mail program features, e.g., an inbox, outbox, trash, message composition options, etc.

Control then transfers to block 114, which represents the client computer 34 waiting for the user to select a view option from the main mail page 40. Upon receiving such a request, control transfers to block 116, which represents the mail applet 46 fuinctioning as a file viewer to allow the user to traverse and view information on files in the post office system 66. The user may view information on the files in the post office system without downloading such files. In preferred embodiments, a user logged into the post office system 66 is restricted to only viewing files in such user's mailbox and not files in other users' mailboxes.

FIG. 2b illustrates a preferred embodiment of logic for allowing the user to select a file in the post office system 66 to view and download to the client computer 34 in accordance with the present invention. Block 130 represents the client computer 34 waiting for the user to select a file in the post office system 66. In preferred embodiments, the user would first view information on the files in the user mailbox in the post office system 66 in the manner discussed with respect to FIG. 2a. The user may select a viewed file with an input device attached to the client computer 34. For instance, if a mouse pointer is used as the input device, then the user may select a file in the post office system 66 by double-clicking the viewed file with the mouse pointer. Upon selecting a file at block 130, control proceeds to block 132 which represents the mail applet 46 using the Java™ showDocument command to cause the web browser 38 to open the view page 44 including the selected file. The view page 44 may reference the selected file using a Uniform Resource Locator (URL) name in the local HTTP server 56. For instance, if the user selects a message file in the post office system 66, the selected message may have the following URL in the local HTTP server 56:

http:\\localhost:1110/MESSAGExxxxx.xxxx

Control transfers to block 136 which represents the web browser 38 requesting the user selected file from the local HTTP server 56. To retrieve the user selected file included in the view page 44, the web browser 38 may issue a Java GET command, such as the following: GET MESSAGExxxxx.xxxx to retrieve the user selected message. Control transfers to block 138, which represents the local HTTP server 56 passing the request for the selected file to the mail applet 46. Control then transfers to block 140 which represents the mail applet 46 determining whether the selected file is already located in the post office cache 54. If so, control transfers to block 142; otherwise control transfers to block 144. Block 142 represents the mail applet 46 obtaining the requested file from the post office cache 54. Block 144 represents the mail applet 46 accessing the post office system 66 to obtain the selected file. Block 146 represents the mail server 62 downloading the selected file from the post office system 66 to the post office cache 54 in the client computer 34. In this way, files are only downloaded from the post office system 66 when unavailable in the cache 54, thereby minimizing downloading operations and data transfer time.

From blocks 142 and 146, control transfers to block 148 which represents the mail applet 46 assembling an HTML template including tags to the selected file already stored in the post office cache 54 or downloaded from the post office system 66. An example of an HTML template (1) for the view page 44 that the mail applet 46 would assemble is provided below. In this example (1), the user selected message is identified as 863822044.000.

(1)<html>
<frameset rows="20%,80%">
<frameset cols="60%,40%">
<framename="HeaderArea"src="http://localhost:1110/HEADER+863822044.000">
<frame name="AttachmentArea"
src="http://localhost:1110/ATTACHMENTS+863822044.000">
</frameset>
<frame name="ContentArea"src="http://localhost:1110/BODY+863822044.000">
<frame name="ControlArea"src="http://localhost:1110/CONTROLS+863822044.000">
</frameset>
</html>

The selected message includes four separate component files, HEADER, ATTACHMENTS, BODY, and CONTROLS. These four separate components of the selected message (863822044.000) were downloaded to the post office cache 54 at blocks 144 and 146 and are identified by a URL in the local HTTP server 56. The HTML template (1) in the above example creates four frames within the view page 44. Each frame in the view page 44 tags the URL for one of the above four component files to display in that frame. The "HEADER" is a plain text document that includes message information, such as the author, recipients and subject of the message. "ATTACHMENTS" is an HTML document that contains a list of URL links to the actual attachments to the message. An example (2) of an ATTACHMENT HTML page displayed in one of the frames of the view page 44 is provided below:

(2) <html><body>
parts: 2<p>
<a href="http://localhost:1110/PART+863822044.000+0" target="ContentArea">0: null: text/plain
</a><p>
<a href="http://localhost: 1110/PART+863822044.000+1" target="ContentArea">1: null: text/html
</a><p>
</body></html>

The PART is the actual data for each part of the mime message (or attachment). The BODY is the main text of the message, and may be plain text or an HTML file. CONTROLS is an applet that generates a control panel of icons representing various compose operations discussed below. The user can select one of the operations from the control panel to reply or forward the message displayed in the other frames of the view page 44. Selection of a compose operation spawns the compose page 42 in the manner discussed below.

Thus, the view page 44 generated by the HTML template (1) in the above example displays a header for the message in one frame, the body of the message in a second frame, information on any additional attachments to the message in a third frame, and icons representing various compose operations, which provide a link to the compose page 42, in the fourth frame.

From block 148, control transfers to block 150 which represents the mail applet 46 passing the assembled HTML template for the view page 44 to the local HTTP server 52. Control transfers to block 152 which represents the local HTTP server 52 passing the assembled template to the web browser 38 to display the view page 44 and selected file, which in the above example is the contents of the selected message.

FIG. 2c illustrates a preferred embodiment of the logic for performing compose operations, such as composing new messages, replying to messages, and forwarding messages. The compose page 42 can be invoked from the main mail page 40 or from the frame in the view page 44 running the CONTROLS applet. Block 160 represents the client computer 34 waiting for the user to invoke a compose operation from the main mail page 40 or view page 44. In preferred embodiments, the user may perform the following compose operations: creating a new message; forwarding a message; replying to the sender of the message; replying to all addressees in a message; replying to the sender with the message included; replying to all addressees with the message included; deleting the message; and printing the message. Many of these operations, such as forwarding and replying, may only be invoked from within the view page 44 while a selected message is displayed.

Control transfers to block 162 which represents the view applet 50 or mail applet 46 transferring a command corresponding to the selected compose operation to the local HTTP server 52. Below is list of HTTP commands used to initiate compose operations:

CREATE: Creates a message.
FORWARD: Forwards a message.
REPLYTOSENDER: Compose new message to reply to sender of message.
REPLYTOALL: Replies to all addressees in a message.
REPLYTOSENDERWITHMESSAGE: replies to sender with message included.
REPLYTOALLWITHMESSAGE: Replies to all addressees with the message.
DELETE: Deletes a message.
PRINT: Prints a message.

The mail applet 46 or view applet 50 would send one of the above commands corresponding to the user selected operation. From block 162, control transfers to block 164 which represents the local HTTP server 52 transferring the command to the mail applet 46. Control transfers to block 166 which represents the mail applet 46 assembling a compose page 42 including the compose applet 48 to perform the user selected compose operation. If the user had invoked the compose operation while viewing a message in the view page 44, the mail applet 46 may include the viewed message or information thereon in the assembled compose page 42. In such instance, the compose operation relates to the message the user was previously viewing. After assembling the compose page 42, control transfers to block 168 which represents the mail applet 46 sending the compose page 42 to the local HTTP server 52. Control transfers to block 170, which represents the web browser 38 displaying the assembled compose page 42 and running the compose applet 48 therein.

Control then transfers to block 172 which represents the user performing the selected compose operation in the compose page and selecting to send a composed message to the post office system 66. If the user had selected compose operations such as deleting or printing a message, then the send option may not be available. However, if the send option is available and was selected, control transfers to block 174 which represents the compose applet 48 transferring the sent message to the local HTTP server 52. Control then transfers to block 176 which represents the local HTTP server 52 transferring the sent message to the mail applet 46, which, at block 178, transfers the sent message to the post office system 66 via the network 32.

In further embodiments, multiple compose pages 42 and view pages 44 may be opened in the web browser 38 at the same time. To implement multiple pages, the compose 48 and view 50 applets would include an argument for a code which identifies the current message opened in the compose 42 or view 44 page running the compose 48 or view 50 applet, respectively. This way, the compose 48 or view 50 applet running in a page will recognize which message it is operating on.

Communication Between Applets In Pages

The present invention discussed above provides for communication between the applets 46, 48, 50 within HTML pages 40, 42, 44. In preferred embodiments, the view applet 50 and compose applet 48 communicate with the mail applet 46 via the local HTTP server 52 within the mail applet 46. For instance, as discussed above, the CONTROLS applet, which runs within the View page 44, would communicate a command to invoke a compose operation to the local HTTP server 52 within the mail applet 46. The local HTTP server 52 then communicates the command to the mail applet 46. The mail applet 46 generates a compose page 42 in accordance with the command from the CONTROLS applet. If the user creates a message within the compose page 42, then the compose applet 48 communicates the message to the local HTTP server 52, which forwards the message to the mail applet 46, which in turn transfers the message to the post office system 62 using the mail protocol 64.

In this way, applets within different pages opened within a browser communicate with each other via a local server within one of the pages. The web browser provides the structure and protocol for communication activities between applets, thereby precluding the need to develop extensive protocols and systems to provide inter-applet communication.

The present invention is especially suited for systems in which only one socket is opened between a client computer and a remote server. One page containing a main applet regulates communication between the web browser and the remote server. Other applets running in different web pages interface with the remote server via the local HTTP server and the main applet. Moreover, the main applet can also interface between the other applets and external programs, databases, etc. located in the client computer running the web browser or a remote computer. This structure provides greater intelligence to HTML pages, wherein the HTML pages do more then just display information, but perform interactive, dynamic operations independent of user interaction.

Conclusion

This concludes the description of the preferred embodiments of the invention. The following describes some alternative embodiments for accomplishing the present invention.

In alternative embodiments, the applets may be downloaded from a server other than an HTTP server and may be in a format different from the JAR format described above.

In further embodiments, the functions described with respect to the mail applet, the compose applet, and the view applet may be performed by one or more applets in a manner different than the manner described above. Moreover, the local HTTP server may be spawned in the web browser outside of the page including the main applet.

In addition, those skilled in the art will appreciate that the present invention is not limited by a specific programming language. The applets may be implemented in other programming languages, such as C, C++, PERL, Cobol, Smalltalk, etc.

Still further, the compose, view, and main mail page may be implemented in formats other than the HTML formats described above and the applets may communicate by a means other than the local HTTP server design described above.

Although the present invention is described with respect to a post office system, those skilled in the art will appreciate that the present invention may be used to access a database system, other than a post office system, from a remote computer over a network. In such case, the user may utilize the applets and preferred embodiments discussed with respect to the post office system to access and view information on files in the database system over the network, download viewed files, view the contents of downloaded files, and compose files at the remote location for transmittal to the database system In summary, the present invention discloses a system for providing communication between applets. A browser is executed within a computer and a server program including a protocol is executed in the browser. A first page is executed within the browser and a first applet is executed within the first page. A second page is executed within the browser and a second applet is executed within the second page. The second applet transmits data to the server program using the protocol. The first applet executing in the first page processes the data transmitted from the second applet to the server program.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for communicating between a first applet executing in a first page displayed in a browser and a second applet executing in a second page displayed in the browser, wherein the browser has an address space and communicates with servers over a network using a pre-defined communication protocol, the method comprising:

using the first applet to spawn a local server program in the browser address space wherein the local server program has an address and communicates with the browser using the communications protocol;

transmitting data from the second applet to the browser using the communication protocol, whereupon the browser forwards the communication to the local server program by using the local server program address;

forwarding the communication from the local server program to the first applet; and executing the first applet to process the data.

2. The method of claim 1, wherein the browser is an HTML web browser and the communication protocol is the HTTP protocol.

3. The method of claim 1, wherein the data transmitted by the second applet includes a request for data, wherein the step of executing the first applet to process the data further includes the steps of generating a response to the request for data and transmitting the response to the local server program, and further comprising the steps of:

transmitting the response from the local server program using the communication protocol to the second page; and executing the second applet in the second page to process the response.

4. The method of claim 1, wherein the data transmitted by the second applet to the local server program includes a command, wherein the step of executing the first applet to process the data further includes the steps of generating a response to the command and transmitting the response to the local server program, further comprising the steps of:

transmitting the response from the local server program using the communication protocol to the second page; and executing the second applet in the second page to process the response.

5. The method of claim 4, wherein the step of executing the first applet in the first page to generate a response to the command includes the step of generating a third page, wherein the step of transmitting the response comprises transmitting the third page to the browser, further comprising the step of displaying the third page with the browser.

6. The method of claim 1, further comprising the steps of executing the first applet in the first page to perform the steps of establishing a connection with a remote server over a network using a second protocol and transmitting the data received from the second applet to the remote server via the network using the second protocol.

7. The method of claim 6, wherein the second protocol is a member of the set of protocols comprising the Post Office Protocol, the Internet Message Access Protocol, the Lightweight Directory Access Protocol, and the Simple Mail Transfer Protocol.

8. Apparatus for communicating between a first applet executing in a first page displayed in a browser and a second applet executing in a second page displayed in the browser, wherein the browser has an address space and communicates with servers over a network using a pre-defined communication protocol, the apparatus comprising:

a method in the first applet that spawns a local server thread in the browser address space wherein the local server thread has an address and communicates with the browser using the communication protocol;

a method in the second applet that transmits data from the second applet to the browser using the communication protocol, whereupon the browser forwards the communication to the local server thread using the local server thread address;

a method in the local server thread that forwards the communication from the local server thread to the first applet; and a method in the browser that executes the first applet to process the data.

9. The apparatus of claim 8, wherein the first page has an address space and the apparatus further includes a method in the first applet which spawns the local server thread in the first page address space.

10. The apparatus of claim 8, wherein the browser is an HTML web browser and the communication protocol is the HTTP protocol.

11. The apparatus of claim 8, wherein the data transmitted by the second applet to the browser includes a request for data and wherein the first applet processes the data by generating a response to the request for data and transmitting the response to the local server thread, the apparatus further comprising:
   a method in the local server thread that transmits the response to the second page using the communication protocol; and
   a method in the second applet that processes the response.

12. The apparatus of claim 8, wherein the data transmitted by the second applet to the local server thread includes a command, wherein the first applet processes the data by generating a response to the command and transmitting the response to the local server thread, the apparatus further comprising:
   a method in the local server thread that transmits the response to the second page using the communication protocol; and
   a method in the second applet that processes the response.

13. The apparatus of claim 12, wherein the first applet includes a method operable in response to the command for generating information for a third browser page and for transmitting the third page information to the browser, and wherein the browser comprises a method for displaying the third page information.

14. The apparatus of claim 8, further comprising a method in the first applet which establishes a connection with a remote server over a network using a second communication protocol and transmits the data received from the second applet to the remote server via the network using the second communication protocol.

15. The apparatus of claim 14, wherein the second communication protocol is a member of the set of protocols comprising the Post Office Protocol, the Internet Message Access Protocol, the Lightweight Directory Access Protocol, and the Simple Mail Transfer Protocol.

16. A computer program product for communicating between a first applet executing in a first page displayed in a browser and a second applet executing in a second page displayed in the browser, wherein the browser has an address space and communicates with servers over a network using a pre-defined communication protocol, the computer program product comprising a computer usable medium having computer readable program code thereon, including:
   program code operable by the first applet for spawning a local server program in the browser address space wherein the local server program has an address and communicates with the browser using the communication protocol;
   program code for transmitting data from the second applet to the browser using the communication protocol, whereupon the browser forwards the communication to the local server program using the local server program address;
   program code for forwarding the communication from the local server program to the first applet; and
   program code for executing the first applet to process the data.

17. The computer program product of claim 16, wherein the first page has an address space and the program code for spawning the local server program spawns the local server program in the first page address space.

18. The computer program product of claim 16, wherein the browser is an HTML web browser and the protocol is the HTTP protocol.

19. The computer program product of claim 16, wherein the data transmitted from the second applet includes a request for data, wherein the program code for executing the first applet to process the data further includes program code that generates a response to the request for data and transmits the response to the local server program, and the computer program product further comprises:
   program code for transmitting the response from the local server program using the communication protocol to the second page; and
   program code for executing the second applet in the second page to process the response.

20. The computer program product of claim 16, wherein the data transmitted by the second applet to the local server program includes a command, wherein the program code for executing the first applet to process the command further includes program code that generates a response to the command and transmits the response to the local server program, and the computer program product further comprises:
   program code for transmitting the response from the local server program using the communication protocol to the second page; and
   program code for executing the second applet in the second page to process the response.

21. The computer program product of claim 20, wherein the program code that generates a response to the command includes program code for generating a third browser page, wherein the program code for transmitting the response comprises program code for transmitting the third browser page to the browser and the computer program product further comprises program code for displaying the third browser page with the browser.

22. The computer program product of claim 16, further comprising program code in the first applet for establishing a connection with a remote server over a network using a second protocol and for transmitting the data received from the second applet to the remote server via the network using the second protocol.

23. The computer program product of claim 22, wherein the second protocol is a member of the set of protocols comprising the Post Office Protocol, the Internet Message Access Protocol, the Lightweight Directory Access Protocol, and the Simple Mail Transfer Protocol.

24. A computer data signal embodied in a carrier wave for communicating between a first applet executing in a first page displayed in a browser and a second applet executing in a second page displayed in the browser, wherein the browser has an address space and communicates with servers over a network using a predefined communication protocol, the computer data signal comprising:
   program code operable by the first applet for spawning a local server program in the browser address space wherein the local server program has an address and communicates with the browser using the communications protocol;
   program code for transmitting data from the second applet to the browser using the communication protocol, whereupon the browser forwards the communication to the local server program by using the local server program address;
   program code for forwarding the communication from the local server program to the first applet; and
   program code for executing the first applet to process the data.

* * * * *